Figure 1:
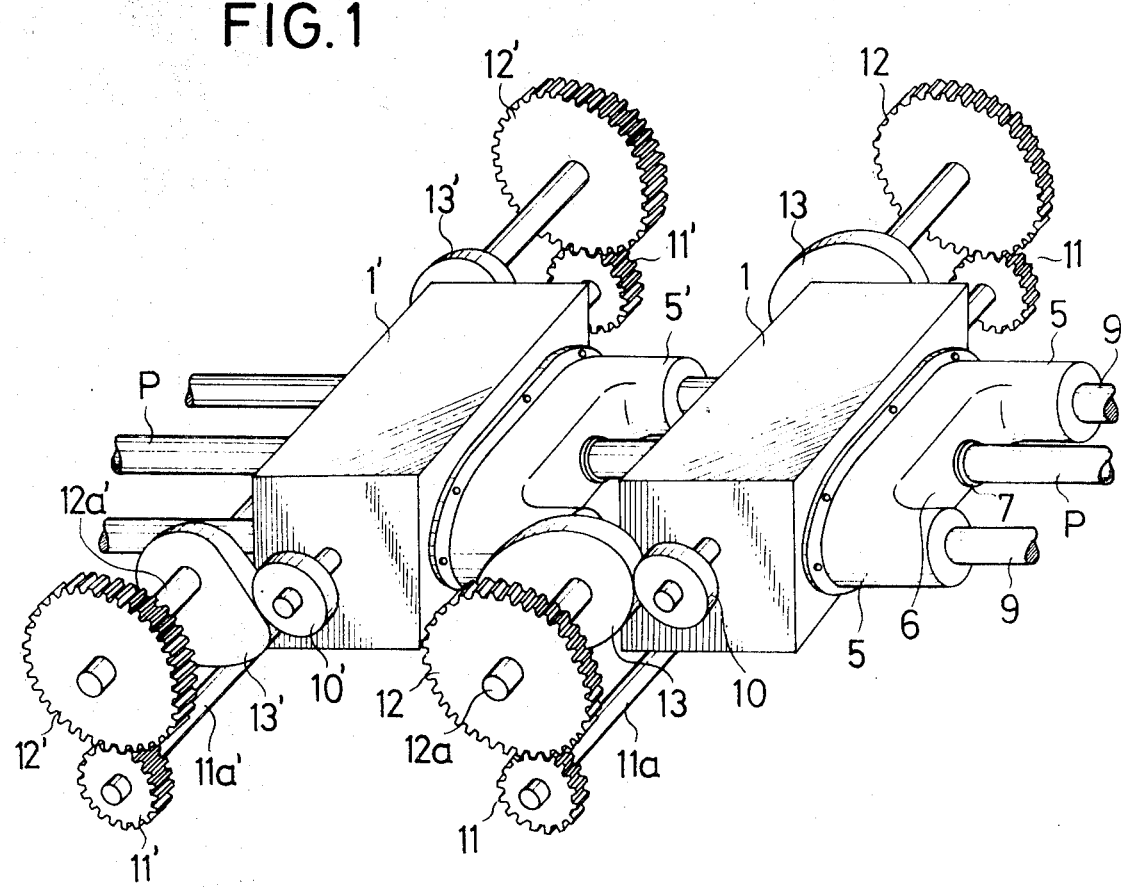

United States Patent

[11] 3,549,072

| [72] | Inventor | Kinori Ito<br>1741 Higashiterao-cho Tsurumi-ku,<br>Yokohama, Japan |
|---|---|---|
| [21] | Appl. No. | 774,990 |
| [22] | Filed | Nov. 12, 1968 |
| [45] | Patented | Dec. 22, 1970 |
| [32] | Priority | Nov. 13, 1967 |
| [33] | | Japan |
| [31] | | No. 42/72911 |

[54] HIGH-POWER FEED CONTROLLING GEAR FOR METALLIC PIPE AND ROD MATERIALS
1 Claim, 5 Drawing Figs.

[52] U.S. Cl................................................. 226/112, 226/167
[51] Int. Cl................................................. B65h 17/36

[50] Field of Search............................................ 226/112, 108, 158, 162, 167

[56] References Cited
UNITED STATES PATENTS

| 1,767,692 | 6/1930 | Morin.......................... | 226/112 |
| 2,990,091 | 6/1961 | Goldsworthy et al......... | 226/112 |
| 3,474,946 | 10/1969 | Desplats et al............... | 226/112 |

Primary Examiner—Allen N. Knowles
Attorney—Linton & Linton

ABSTRACT: The feed controlling gear has a pair of frames slideable on fixed guide shafts through the action of driven cams each pushing one of the frames at a different time, but in the same direction and each frame has a slideable chuck through which the work piece extends and said chucks are moved into work engaging positions when their frame is being moved by said cams.

PATENTED DEC 22 1970

3,549,072

SHEET 1 OF 2

INVENTOR.
Kinori Ito
BY

HIGH-POWER FEED CONTROLLING GEAR FOR METALLIC PIPE AND ROD MATERIALS

This invention relates to a high-power feed controlling gear for feeding materials to the working processes where metallic pipe and rod materials are put into dies under pressure and rolled or where metallic pipe materials are set to core bars under pressure for manufacturing elbows.

In this kind of manufacturing processes it is absolutely necessary for obtaining the required products to feed the materials continuously and always at a constant speed against the resistance of the working portion.

Generally known conventional feed controlling gears are provided with a pushing and pressing body driven by a cylinder piston rod or with plurality of rollers and arranged side by side both at upper and lower positions. In the former case, the pushing and pressing body for materials repeats intermittent motion as it moves back and forth for a certain fixed distance by the reciprocating motion of the piston rod so that it is difficult to feed the materials continuously and obtain uniform products. In the latter case, the gear is apt to be complicated in the entire mechanism as it requires many feed rollers above and below materials so that not only is the equipment cost very high but also such high-power feeding i operation as can meet with the resistance of the working portion can hardly be expected.

In order to eliminate these disadvantages, therefore, the present inventor has developed a gear having a composition as described below.

The essential point of this invention is the providing of a pair of movable frames for holding materials with strong power. They have the same mechanism and placed at the front and are back, of the gear so that they can feed the materials continuously and always at a constant speed while reciprocating alternately for a predetermined distance by the action of cams having uniform motion.

This composition will be described more in detail by referring to the accompanying drawing.

Figure 3:
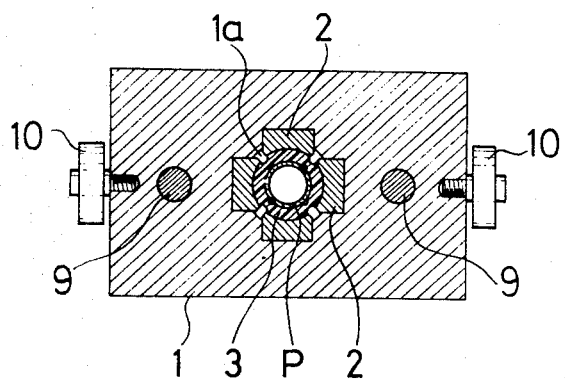
Figure 2:
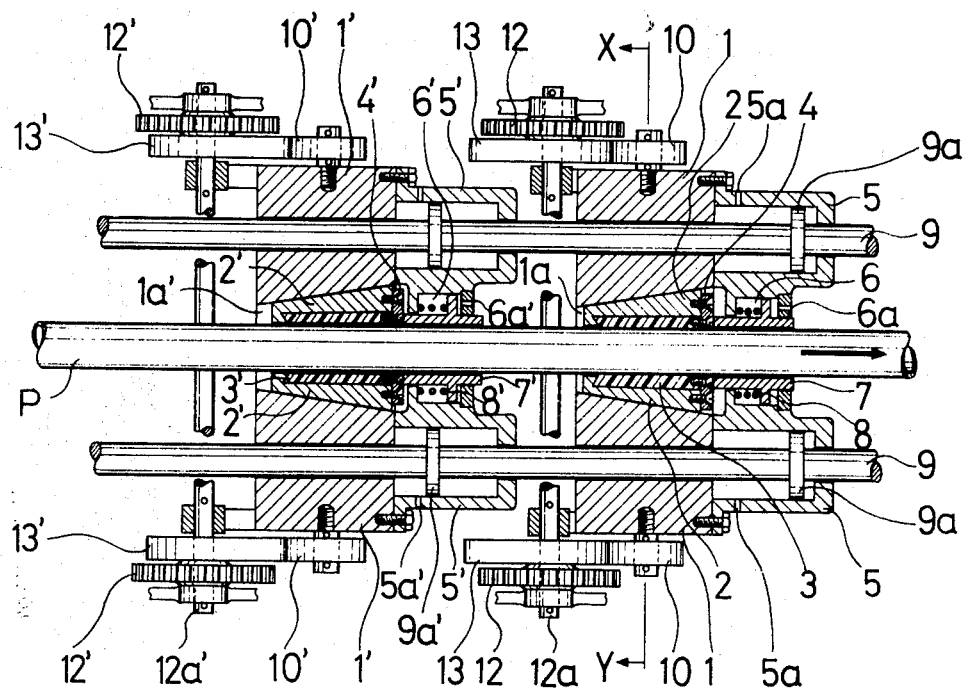
Figure 4:
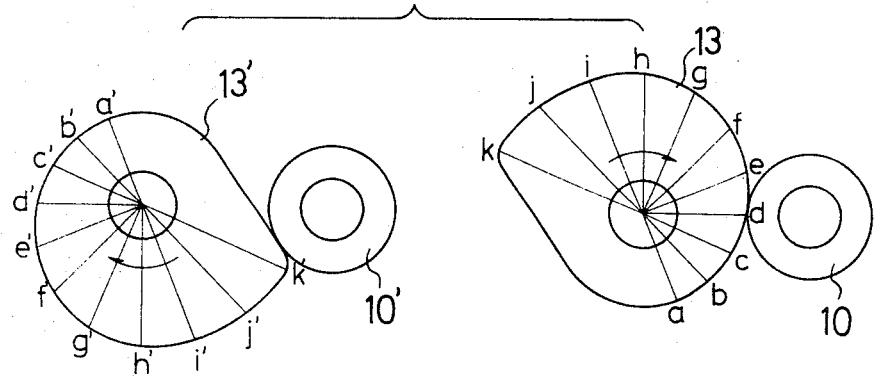
Figure 4A:
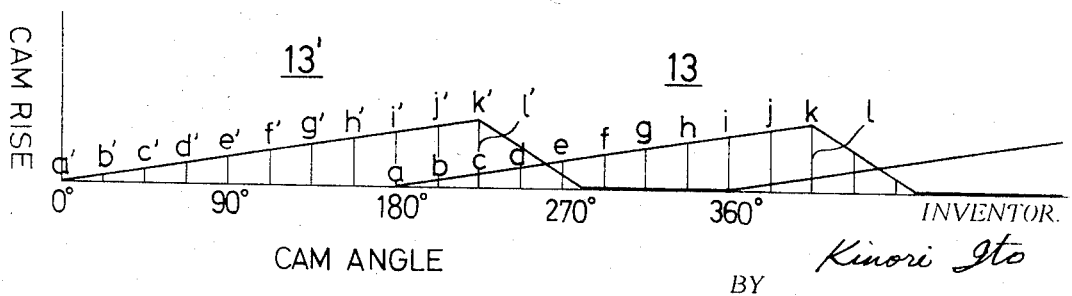

The accompanying drawings illustrates an embodiment of this invention, of which FIG. 1 is a perspective view of the whole of the gear partially cut off, FIG. 2 is a cross-sectional plan of the whole of the internal construction of the gear shown in FIG. 1, FIG. 3 is a sectional view of the movable frame cut along the X—Y line of FIG. 2, FIG. 4 is a front view of the front and rear cams shown in FIG. 2, and FIG. 4a is a diagram of the cams.

The movable frames 1, 1' are arranged at the front and back of the gear with suitable space between them so that they can each reciprocate for a predetermined distance along the stationary guide shafts 9, 9 passing through them on either side. At the center of the frames 1, 1' are the tapered holes 1a, 1a' passing through them for holding the chucks for the material P and at one side of the frames are the rollers 10, 10'. 2, 2' are supports tapered on the outer side and having the synthetic rubber or plastic cylindrical elastic chucks 3, 3' fixed tightly on the inside. Said supports are divided into several parts so that they can press the chucks on the surface of the material, and they are set to the interior of the tapered holes 1a, 1a' of the movable frames with their front sides fixed to the plates 4, 4'. 5, 5' are the air cylinders of the pistons 9a, 9a' fixed to the guide shafts 9, 9. They are formed integrately with the center cylinders 6, 6' which enclose the cylindrical piston rods 7, 7' for pushing plates plates 4, 4' of the chucks with the springs 8, 8' between them, and are placed integrately at the front side of the movable frames 1, 1'. 5a, 5a' and 6a, 6a' are the air charge inlets for the cylinders 5, 5' and 6, 6' respectively. 11, 11' are the driving gears for rotating the uniformly moving cams 13, 13' in contact with the rollers 10, 10' at both sides of the moving frames and the gears 12, 12' around the coaxial shafts 12a, 12a'. The shafts 11a ,11a' for these driving gears are connected to the driving shafts of motors (not shown).

Composed as described above, the gear of this invention is capable of feeding the material P continuously and at a constant speed through the actions of the pair of movable frames 1, 1' and of the uniformly moving cams 13, 13' which drive the movable frames.

The movable frames 1, 1' are provided side by side and suitably spaced apart at the front and back of the stationary guide shafts 9, 9' which pass through them to both sides. The elastic chucks 3, 3' fixed to the supports 2, 2' are set in the tapered holes 1a, 1a' at the center of the movable frames. The cylinders 5, 5' and 6, 6' respectively enclosing the pistons 9a, 9a' of the guide cylinders and the piston rods 7, 7' for pushing the chucks are placed integrately at the front side of the movable frames. The two uniformly moving cams 13, 13' which rotate with the gears 12, 12' engaging with the driving gears 11, 11' move the front and rear movable frames 1, 1' continuously and alternately for a predetermined distance along the guide shafts 9, 9 via the rollers 10, 10' in contact with the cams 13, 13'. Furthermore, since the cams 13, 13' are uniformly moving cams having rotational angle in proportion to the cam rise, the moving speed of the frames 1, 1' is always constant. Also the cams are so designed as to act together only for a definite time so that the operation will not become intermittent when both cams change their actions, thus enabling the material P to be fed continuously.

Next, the above-mentioned series of actions will be described with regard to each portion.

The chucks 3, 3' set in the tapered holes 1a, 1a' at the center of the movable frames 1, 1' are elastic cylindrical bodies made of synthetic rubber or plastics. They are fixed in the supports 2, 2' which are divided into several portions and tapered on the outer side, so the deeper they are inserted in the tapered holes 1a, 1a' the greater is their holding force as they are more compressed. Therefore, if the material P is passed through the movable frames 1, 1' with the chucks kept loose and the plates 4, 4' are pushed by the piston rods 7, 7' of the center cylinders 6, 6' the chuck supports 2, 2' will be pressed deep into the tapered holes 1a, 1a' and the chucks 3, 3' will come in close contact with the surface of the material P to hold it forcibly.

Then the uniformly moving cams 13, 13' rotating with the driving gears 11, 11' and the gears 12, 12' push the rollers 10, 10' and move the movable frames 1, 1' forward along the guide shafts for a predetermined distance, with the result that the material P will be moved forward for the same distance. If the air in the center cylinders 6, 6' is purged at that time, the piston rods 7, 7' is returned by the power of the springs 8, 8' to release the pressure from the plates 4, 4'. If the air is charged into the cylinders 5, 5' at the same time, the movable frames 1, 1' go back from the piston 9a, 9a' of the guide shafts. At that time the chuck supports 2, 2' automatically come slightly off the tapered holes 1a, 1a' and go back together with the frames, loosening the hold of chucks 3, 3' on the surface of the material, so no action is taken on the material when they go back.

Making a stroke in this way, the movable frames 1, 1' move the material P forward for the same distance as their advance. However, while one frame is advancing the other is retreating and before one frame completes advancing the other starts advancing with its chuck holding the material, so that it is an advantage that the pair of movable frames repeat the motion to feed the material continuously and at a constant speed without causing a delay in the feeding of the material P.

FIGS. 1 and 2 illustrate the condition when the rear movable frame has completed advancing the piston rod 7' of the center cylinder 6' is returned, air is charged into the cylinder 5' and the rear frame starts retreating with the chuck 3' loosening its hold on the material P, and that on the other hand the front movable frame 1 has already started advancing with the cam 13 and moves a little forward with the chuck 3 holding the material P, both movable frames carrying on such continuous operation.

This operation will be further explained by referring to FIGS. 4 and 4a.

The cams 13 and 13' are moving uniformly with the rotational angle a changing in proportion to the cam rise and have the planes of action in proportion to the circumferential angles from $a, b, c \ldots k$ and from $a', b', c' \ldots k'$ and the linear idle planes $k-a$ and $K'-a'$. So when the cams rotate in direction of the arrows they push the rollers at a constant speed with their circumferential planes of action and move the material forward, but when they have passed the top points $k$ and $k'$ the rollers make only the frames retreat along the idle planes.

The cam diagram of FIG. 4a illustrates the action of the cams shown in FIG. 4. When one cam 13' comes to the point $i$ approaching the top point $k'$ where it completes its action, the other cam 13 starts its action at the starting point $a$. Therefore, when one reaches the top point $k'$ the other is already at the point $c$, so that even through the first cam completes its action the material goes on advancing always at a constant speed.

Thus both cams act alternately, but they act together at the same time for a definite time, namely for the distances $k'-k'$ and $a-c$ or $i-k$ and $a'-c'$ lest the material should stop during the operation. In other words, the center cylinders 6, 6' for tightening and loosening the hold of the chucks and the cylinders 5, 5' for making the frames retreat act in agreement with the action of the respective cams. The length of displacement of the cams which act on the rollers is the distance L, L' at the top points $k$, $k'$, so both front and rear movable frames can feed the material against the resistance of the working portion with the aid of the driving mechanism provided on both sides, while reciprocating only for that distance. Having the above-mentioned characteristics, the gear of this invention enables one to obtain desired uniform products easily if used in rolling metallic pipe and rod materials or manufacturing elbows from metallic pipe materials.

I claim:

1. A feed controlling gear for moving cylindrical metal work pieces comprising a pair of frames each having a tapered opening therein, a pair of supports each tapered on their outer side and divided into several portions, each of said supports mating with one of said frame openings and having a bore, elastic chucks each seated in one of said support bores and having an opening for receiving the workpiece therethrough, stationary guide shafts having said frames slideable thereon with one frame spaced behind the other, pistons fixedly mounted on said guide shafts, cylinders attached to said frames having said pistons slideable therein, further cylinders attached to said frames, piston rods slideable in said further cylinders and positioned for contacting and moving said supports and said chucks into their work engaging position, uniformly driven shafts, rollers on said frames each riding on one of said cams for being alternately moved by said cams whereby said frames are moved alternately along said guide shafts for moving the workpiece continuously and at a constant speed.